Figure 1:
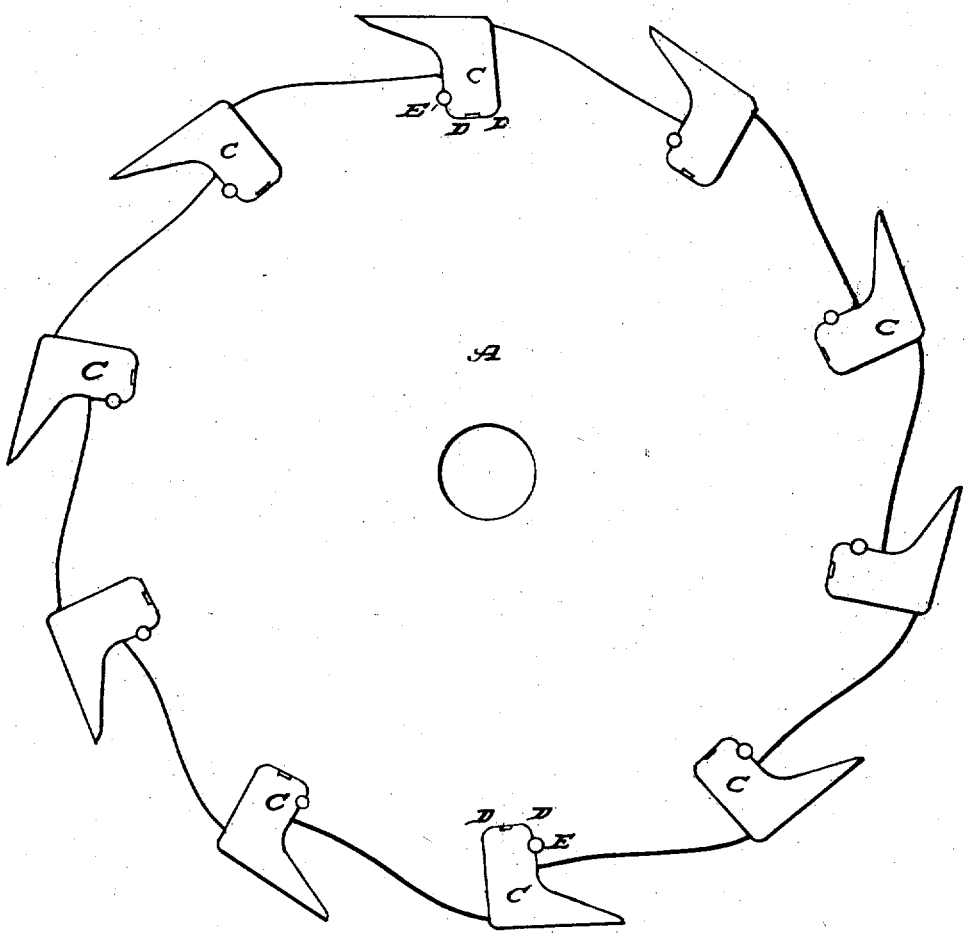
Figure 2:
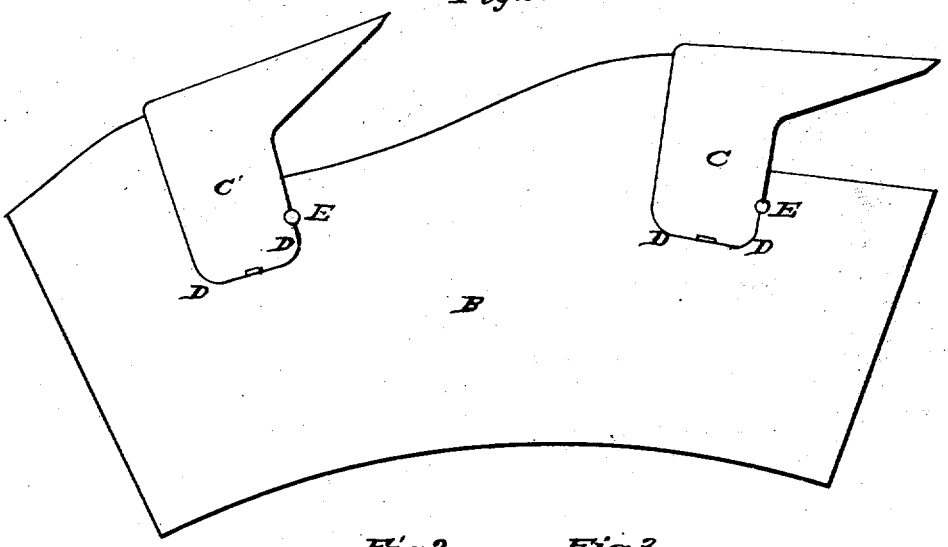
Figure 2:
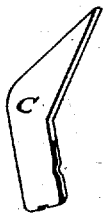

2 Sheets—Sheet 1.

N. W. SPAULDING.

Saw.

No. 1,456.

Reissued April 21, 1863.

Witnesses
Samuel Cross
W Wrontale

Inventor
Nathan W. Spaulding

N. PETERS, Photo-Lithographer, Washington, D. C.

2 Sheets—Sheet 2.

N. W. SPAULDING.

Saw.

No. 1,456.

Reissued April 21, 1863.

Witnesses
Samuel Cross
W. B. Marshall

Inventor
Nathan W. Spaulding

N. PETERS. Photo-Lithographer, Washington, D. C.

UNITED STATES PATENT OFFICE.

NATHAN W. SPAULDING, OF SAN FRANCISCO, CALIFORNIA.

IMPROVEMENT IN SETTING TEETH IN SAWS AND SAW-PLATES.

Specification forming part of Letters Patent No. 33,270, dated September 10, 1861; Reissue No. 1,456, dated April 21, 1863.

*To all whom it may concern:*

Be it known that I, NATHAN W. SPAULDING, of the city of San Francisco, (formerly of the city of Sacramento,) in the State of California, have invented a certain new and useful Improvement on Saws and Saw-Plates; and I do hereby declare the following to be a full, clear, and exact description thereof, reference being had to the accompanying drawings, and to the letters and marks thereon.

My improvement relates to that class of saws or saw-plates wherein detachable or removable teeth are fitted into recesses or sockets in the edge or periphery of the saw or saw-plate.

Previous to my invention the recesses or sockets formed in the edge or periphery of the saw-plates, and into which the teeth were to be fitted, were of rectangular form, the bottom or base of the socket or recess being at right angles to the sides or the recess or socket being of angular form. The teeth to be fitted into these sockets had also rectangular or angular form—*i. e.*, the body of the teeth or that part which was to be fitted into the socket. In use the pressure of these teeth necessarily bore upon the angles of the sockets, and in consequence of the pressure and strain thereon frequently fractures were made extending from the socket into the saw-plate. These fractures always injured the saw-plate, and often entirely ruined it, so that very considerable loss would occur in using saws with detachable teeth.

Now, my invention has for its object the remedying of the difficulty that existed from the insertion of these teeth into the recesses or sockets above named, and my invention consists in providing the saw or saw-plate with teeth or other pieces set therein in circular lines instead of angular, where the power is applied, whereby the pressure is distributed in equal proportions on the saw or saw-plate, and the danger of splitting, cracking, or breaking is entirely removed.

To enable others skilled in the art to make and use my invention, I will proceed to describe its construction and operation.

I construct my saw or saw-plate in any of the known forms, and fit and apply thereto teeth and other pieces necessary with circular instead of angular lines at the base or other places therein where the pressure or force applies; and in order to obviate the danger arising from the saw or plate splitting, cracking, or breaking at the place where the tooth or other piece is set in the saw or saw-plate, as generally is the case when set therein by angular lines, I set the tooth or other piece in the saw or saw-plate with circular lines, as shown at D D in the accompanying drawings, wherein letter A is a perspective view of a circular-saw plate. Letters B are perspective views of sections of a circular-saw plate. Letters C are perspective views of teeth to be set in the saw or saw-plate. Letters D are perspective of the circular lines in the saw or saw-plate at the base of the teeth where the pressure applies, and where the plate usually splits, cracks, or breaks; and letter E represents a smooth rivet or key to fasten the tooth or other piece in the saw-plate.

In the saw or plate wherein the tooth or other piece is to be set a "gain," with a beveling tongue on the inside and around the edge and a semicircular hole for a key on the lifting side, is to be made, as represented in Figure 4, letters D D, the line at the points D D being circular instead of angular.

Figure 3:
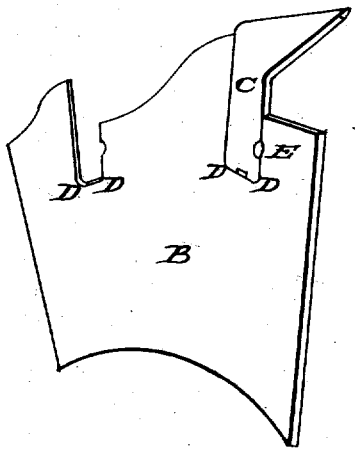

The tooth, as represented in Fig. 3, letter C, is to be made with a beveling groove on the outside or edge, with a semicircular hole on the lifting side corresponding with the hole in the gain, (represented in Fig. 4 at letter E,) by which, with a rivet, to fasten the tooth in the saw-plate. All the corresponding parts of the tooth to be inserted in the gain are to be fitted therein with exactness and precision and fastened with a rivet, as above described.

The recesses or sockets in the saw-plate for the insertion of the teeth may be made when the saw-plate is formed—*i. e.*, in the manufacture of the plate, or they may be made at any subsequent time by using a "gummer" or any other suitable tool or implement. In some instances it may be desirable to embrace the entire surface of the base or bottom of the socket or recess in the circular lines, while in others it may only be necessary to embrace the terminal point of the sides of the socket—that point where the sides and bottom meet, and which constitutes the angle in the straight-line socket or recesses—and the circular lines may be applied to the entire substance of the socket or recess, or they may be limited to the gain only, the application of my invention to the particular saw-plate, of course, being susceptible of being varied as the character of the plate may in the judgment of the maker or operator require. While the circular lines may be greater or less, and embrace a greater or less amount of the recess or socket, the teeth to be inserted therein may also vary in form, it being even better to insert teeth having rectangular bodies or base in the circular-lined sockets than in rectangular or angular sockets.

What I claim as new, and desire to secure by Letters Patent, is—

1. Forming the recesses or sockets in saws or saw-plates for detachable or removable teeth on circular lines, substantially as and for the purpose herein set forth.

2. In combination with sockets or recesses formed in saws or saw-plates, as herein recited, teeth having their base or bottom parts formed or circular lines, as described.

This specification signed this 2d day of January, 1863.

N. W. SPAULDING.

Witnesses:

G. F. ALLARDT,

W. O. ANDREWS.